US007373555B2

(12) United States Patent
Adkisson et al.

(10) Patent No.: US 7,373,555 B2
(45) Date of Patent: May 13, 2008

(54) SYSTEMS AND METHODS CONTROLLING TRANSACTION DRAINING FOR ERROR RECOVERY

(75) Inventors: Richard W. Adkisson, Dallas, TX (US); Huai-Ter V. Chong, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 10/434,920

(22) Filed: May 9, 2003

(65) Prior Publication Data

US 2004/0237005 A1    Nov. 25, 2004

(51) Int. Cl.
   *G06F 11/00* (2006.01)
(52) U.S. Cl. .............................. 714/43; 714/4; 714/18; 714/47; 714/55
(58) Field of Classification Search .................. 714/5, 714/43, 44, 47, 55, 56, 2, 9, 10, 11, 12, 17, 714/18; 710/54
   See application file for complete search history.

(56) References Cited

U.S. PATENT DOCUMENTS

| 4,443,849 | A | | 4/1984 | Ohwada |
|---|---|---|---|---|
| 5,841,969 | A | * | 11/1998 | Fye ............................... 714/56 |
| 5,845,097 | A | * | 12/1998 | Kang et al. .................... 714/55 |
| 5,933,614 | A | * | 8/1999 | Tavallaei et al. ............. 710/306 |
| 6,012,148 | A | | 1/2000 | Laberge et al. |
| 6,145,044 | A | * | 11/2000 | Ogura .......................... 714/56 |
| 6,195,722 | B1 | * | 2/2001 | Ram et al. .................. 710/310 |
| 6,230,282 | B1 | | 5/2001 | Zhang |
| 6,338,151 | B1 | | 1/2002 | Yudenfriend et al. |

OTHER PUBLICATIONS

Chris Greer, Patent Application, entitled "System and Method for In-Order Queue Draining," filed May 9, 2003.
Richard W. Adkisson, et al., Patent Application, entitled "System and Method for Determining Transaction Tme-Out," filed May 9, 2003.
Richard W. Adkisson, et al., Patent Application, entitled "System and Method for Error Capture and Logging in Computer Systems," filed May 9, 2003.
Affidavit of Richard W. Adkisson, Feb. 17, 2005, 4 pages.

* cited by examiner

*Primary Examiner*—Robert Beausoliel
*Assistant Examiner*—Joseph D Manoskey

(57) ABSTRACT

Disclosed are systems and methods for controlling transaction draining for error recovery comprising asserting a control signal to prevent system resources associated with a particular error from issuing new requests, dropping transactions tracked by an out-of-order queue, and issuing transactions not tracked by the out-of-order queue.

23 Claims, 1 Drawing Sheet

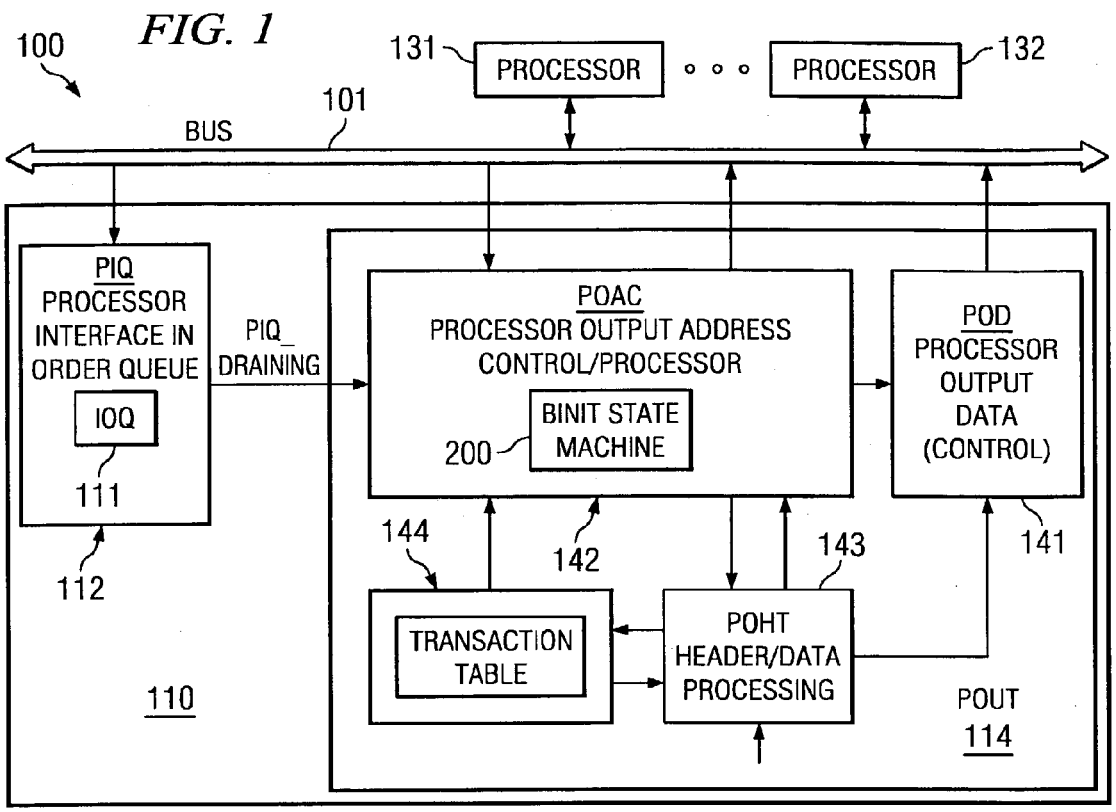
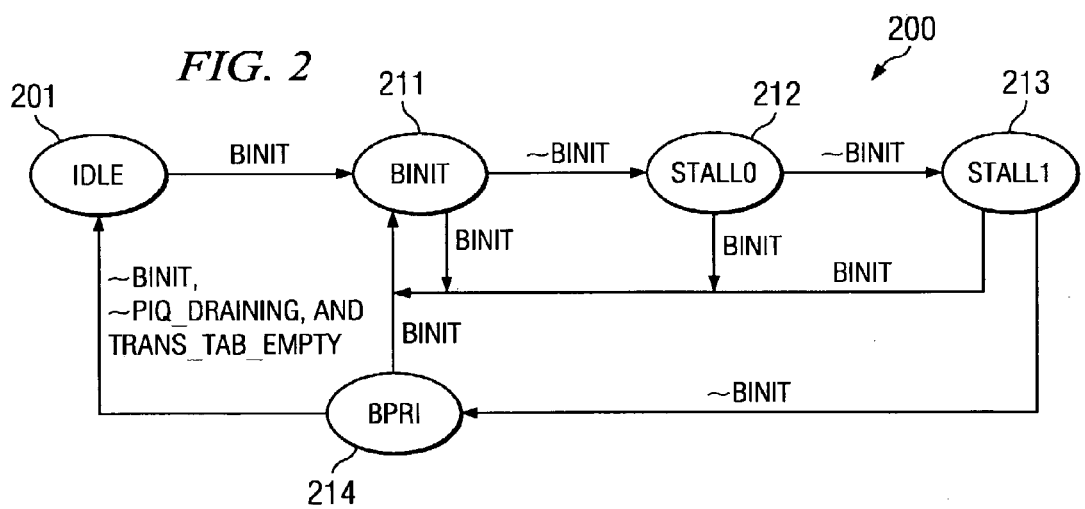
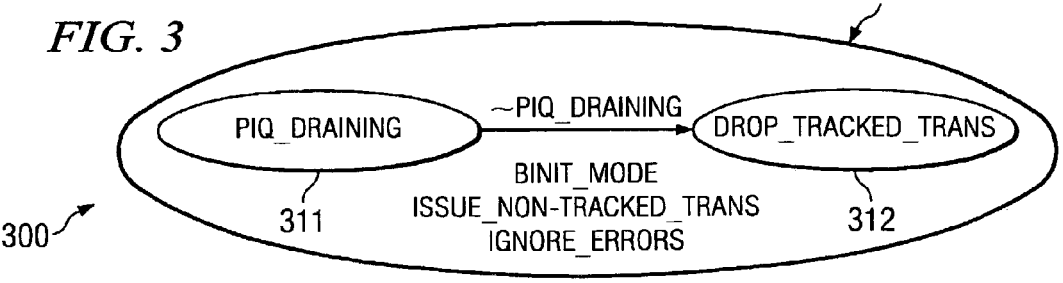

SYSTEMS AND METHODS CONTROLLING TRANSACTION DRAINING FOR ERROR RECOVERY

CROSS-REFERENCE TO RELATED APPLICATIONS

The present application is related to concurrently filed, co-pending and commonly assigned U.S. patent applications Ser. No. 10/435,127 entitled "System and Method for Determining Transaction Time-Out," U.S. patent application Ser. No. 10/443,685 entitled "System and Method for In-Order Queue Draining," and U.S. patent application Ser. No. 10/434,925 entitled "System and Method For Error Capture and Logging in Computer Systems," the disclosures of which are hereby incorporated herein by reference.

BACKGROUND

It is not uncommon today for a computer system to be quite complex, often including multiple processors configured to provide parallel and/or distributed processing. For example, multi-processor computer systems often include not only multiple main processing units (MPUs), but may also include multiple support processors or agents, such as memory processors and the like. These various processors, as well as other system resources such as memory, input/output devices, disk devices, and the like may be distributed throughout the computer system with communication provided by various buses. For example, a computer system may comprise a number of sub-modules, referred to herein as cells or cell cards, having a number of system resources, such as main processing units (MPUs), agents, and/or memories, and buses disposed thereon. System resources of a sub-module may make and/or service requests to and/or from other system resources. Such system resources may be associated with the same sub-module and/or other sub-modules of the system.

To service requests from multiple system resources in an orderly and predictable manner, systems may implement various bus protocols and transaction queues. For example, bus protocols may establish an order in which a plurality of transactions, e.g., requests, snoops, and responses, are to be performed, and perhaps a number of bus cycles each such transaction is to be provided for completion. Similarly, transaction queues may store information with respect to particular transactions "in-process" with respect to a particular system resource. An in-order queue, for example, may be implemented to ensure that particular transaction phases are implemented in a proper order by an associated system resource. Accordingly, an in-order queue may track a number of transactions through their in-order phases, such as might include a request phase, a snoop phase, and a response phase. Similarly, an out-of-order queue or transaction table, for example, may be implemented to track transaction execution which may be returned in any order.

If an error in operation of any aspect of the system, such as with respect to any one of the aforementioned system resources, is detected by the system, an error signal may be generated to notify the appropriate system resources. Such errors may be non-critical, such as isolated to the operation of a single system resource and/or associated with a recoverable operation. However, such errors may be critical in nature, such as requiring initialization of an entire bus (referred to herein as a bus initialization or BINIT error) and, therefore, the system resources thereon.

A bus initialization error, or similar critical error, in a multi-processor system can lead to widespread failure, even system-wide failure, due to the interdependency of the various system resources to issue and/or respond to requests and responses. Although a single processor system may be able to recover from a bus initialization error by purging all pending transactions and fetching new instructions (e.g., "soft booting"), a multi-processor system bus initialization may result in a system "lock-up" requiring a "hard" reset or may be prevented from performing a core dump useful in isolating the source of the error. For example, a bus initialization error may cause particular system resources to "hang" awaiting an anticipated transaction response when a bus upon which a system resource performing the transaction is initialized due to the system resources on the initialized bus ceasing to track their associated queues, and thus ceasing to provide awaited responses to system resources not on the initialized bus. Accordingly, a bus initialization error, or similar error, can result in a cascade failure in which the entire system deadlocks.

It should be appreciated that the above described situation in which a bus initialization error results in a system lock-up requiring a hard reset is undesirable in a high availability (HA) system. Moreover, such a result does not provide for a system "crash-dump" or dumping all the memory to disk or other media to facilitate the operating system (OS) determining the cause of the error, but instead requires a system initialization which does not allow analysis of the state of the system at the time of the error.

SUMMARY

A method for controlling transaction draining for error recovery, the method comprising, asserting a control signal to prevent system resources associated with a particular error from issuing new requests, dropping transactions tracked by an out-of-order queue, and issuing transactions not tracked by the out-of-order queue.

A method for controlling transaction draining in a multi-processor system, the method comprising, preventing particular system resources from issuing new requests, allowing an in-order queue to drain transactions stored therein according to a system protocol, dropping transactions stored in an out-of-order queue, and after the in-order queue has drained the transactions stored therein and the out-of-order queue has dropped the transactions stored therein, allowing the system resources to issue new requests.

A system for controlling transaction draining for error recovery, the system comprising, a first state machine having at least a first error mode state and a second error mode state, wherein the first state machine is operable to enter the first error mode state whenever a particular error is asserted, and wherein the first state machine is operable to enter the second error mode state after the error is asserted, the second error mode state asserting a control signal to hold system resources off of a particular bus while the state machine is in the second error mode state.

A computer program product having a computer readable medium having computer program logic recorded thereon for controlling transaction draining for error recovery, the computer program product comprising, code for asserting a control signal to prevent system resources associated with a particular error from issuing new requests, code for dropping transactions tracked by an out-of-order queue, and code for issuing transactions not tracked by the out-of-order queue.

BRIEF DESCRIPTION OF THE DRAWINGS

FIG. 1 shows a portion of a multi-processor system in which an embodiment of the present invention is implemented;

FIG. 2 shows a state machine for implementing bus initialization transaction draining control according to embodiments of the present invention; and FIG. 3 shows a state machine for implementing bus priority transaction draining according to embodiments of the present invention.

DETAILED DESCRIPTION

Embodiments of the present invention provide systems and methods which facilitate initialization of a portion of a system, such as system resources associated with a particular bus, while allowing remaining portions of the system to continue operation. The teachings of the present invention are particularly useful with respect to multi-processor systems, wherein a large number of transactions, such as may be associated with multiple system resources disposed upon various buses, are distributed throughout the system for execution. Operation of embodiments of the present invention provides for orderly draining, emptying, and/or flushing of one or more queues associated with an identified error to allow graceful crashing and/or initialization of a portion of the system while remaining portions of the system continue to operate.

Embodiments of the invention establish a hierarchy in which transactions are drained or otherwise disposed of in response to detection of a particular critical error, such as a bus initialization error. For example, transactions stored in an in-order queue associated with a bus for which a bus initialization error has been detected may first be allowed to drain. Thereafter, transactions in the out-of-order queue associated with system resources not on the bus for which a bus initialization error has been detected may be returned to the appropriate system resource. Transactions in an out-of-order queue associated with system resources on the bus for which a bus initialization error has been detected may be discarded. As transactions are returned from system resources not on the bus for which a bus initialization error has been detected, e.g., transactions in process on other system buses on behalf of processors on the bus experiencing a bus initialization error, those transactions are discarded according to embodiments of the invention.

According to embodiments of the invention, system resources are held off of a bus experiencing a bus initialization error during a bus initialization mode providing transaction draining. For example, a state machine or state machines may be implemented to assert a bus priority or BPRL signal during a time in which transactions are being drained. An embodiment of the invention deasserts a bus priority signal once all transactions that are in an in-order queue have drained and all transactions tracked by an out-of order queue are discarded or returned. Accordingly, system resources on that bus may be prevented from issuing requests on the bus during a bus initialization mode and allowed to utilize the bus, such as for initialization, after the bus initialization mode.

According to one embodiment, a multi-processor system experiences a bus initialization error with respect to a processor bus thereof. Such a bus initialization error may be the result of unpredicted or unallowed bus status, perhaps beyond an error in which a single processor has returned invalid data or a particular transaction has failed, suggesting that the bus should be reinitialize in order to achieve predictable operation with respect to system resources on that bus. In such a situation, all transactions on that bus are suspect and, therefore, are to be discarded. However, to facilitate returns or responses expected by processors disposed on other buses of the system, the processors on the bus being initialized are held off of the bus while transaction queues are drained. Thereafter, the processors on the bus being initialized are allowed to fetch code and again begin performing new transactions.

Directing attention to FIG. 1, a portion of a computer system in which an embodiment of the present invention is implemented is shown generally as system portion 100. The host system of which system portion 100 is a part of may comprise a multi-processor system, such as a Hewlett Packard rx series server system implementing a plurality of Intel ITANIUM processors.

System portion 100 illustrated in FIG. 1 includes a plurality of processors, here processors 131 and 132, disposed upon bus 101. Bus 101 may be utilized in providing communication between various system resources, such as main processing units (MPUs), e.g., the aforementioned ITANIUM processors, e.g., processors 131 and 132, memory (not shown), and/or the like. Also coupled to bus 101 of the illustrated embodiment is processor interface 110, including processor interface in-order queue (PIQ) 112 and processor output (POUT) block 114.

Processor interface in-order queue 112 of the illustrated embodiment comprises in-order queue 111, which is utilized to track transaction phases to ensure completion of transactions on the bus in-order according to an overriding protocol. Processor output block 114 comprises header/data processing block 143, operable with out-of-order queue or transaction table 144, to track transaction execution on the bus which may be returned in any order. Processor output address control/processing (POAC) block 142 and processor output data (POD) block 141 of processor output block 114 cooperate with transaction table 144 and/or header/data processing block 143 to output header and data information in accordance with transactions on bus 101.

It should be appreciated that system portion 100 may represent only a small portion of a particular system. Accordingly, the system of which system portion 100 comprises a part of may include processors, buses, processor interfaces, and/or other system resources in addition to those shown.

In operation according to one embodiment, transactions issued by a processor, such as processors 131 and 132, are first processed in processor interface in-order queue 112. Accordingly, a transaction may be processed in-order, such as to include a transaction request phase, a snoop phase, and a response phase as reflected by states stored in in-order queue 111. After completing the in-order transaction phases associated with in-order queue 112, transactions may be tracked in transaction table 144 until completion of the transaction.

For example, when a processor performs a memory read, a memory read request from that processor may appear on the bus, be processed in the processor interface in-order queue, and be sent down to the rest of the system for actual retrieval and return of the requested data. However, while the actual retrieval and return of the requested data is being accomplished, a transaction entry may be placed in the transaction table to show that a requested memory read transaction is still pending. Eventually, the requested memory read transaction is going to be returned to the header/data processing block. Header/data processing block will accept the returned information and look to the transaction table to determine how the information is to be handled. Accordingly, a header may be provided to the processor output address controller to indicate associated data is directed toward a particular processor identified in the transaction table. Thereafter, the data may be provided to the processor output data block to put that data out on the bus with the proper information such that the processor that did the read will get that data.

It should be appreciated that various errors may occur at any time, irrespective of the state of completeness with respect to any particular transaction. Such errors may be non-critical, e.g., requiring repeating of a particular operation, or may be critical, e.g., requiring initialization of one or more system resources. For example, a bus initialization error may result in the system resources of a particular bus, such as bus 101, being reinitialized. However, as the system resources of this bus may be requesting and/or servicing transactions from and/or to system resources disposed on buses not experiencing a bus initialization error, simply initializing system resources of a particular bus may not be desirable. For example, initialization of processors and/or processor interfaces of system portion 100 shown in FIG. 1 may result in processors disposed on buses other than bus 101 being "hung" awaiting a response associated with a transaction being performed by a system resource of bus 101. Likewise, initialization of processors and/or processor interfaces of system portion 100 may result in such processors receiving responses associated with a transaction being performed by a system resource disposed on a bus other than bus 101 after their initialization, thereby spawning a subsequent, perhaps critical, error.

Accordingly, embodiments of the present invention implement a state machine or state machines, such as those shown in FIGS. 2 and 3, for controlling transaction draining for error recovery. In operation according to embodiments of the present invention, when a particular critical error, such as a bus initialization error, is detected, a state machine enters an error recovery state or states. Such an error recovery state holds processors and/or other system resources off of the bus while all the then in process transactions on that bus are drained, preferably in compliance with system protocols.

Directing attention to FIG. 2, bus initialization state machine 200, such as may be implemented within processor output address control/processing block 142, is shown. As is known in the art, in general a state machine is any device that stores the status of something at a given time and can operate on input to change the status and/or cause an action or output to take place for any given change. Bus initialization state machine 200 of an embodiment of the present invention is operable to control draining of one or more bus queues while holding processors and/or other system resources off of the bus which is to be initialized.

Bus initialization state machine 200 of the illustrated embodiment includes states 201 and 211-214. State 201 is associated with a first state (state 0) of bus initialization state machine 200, providing a bus initialization idle state (IDLE). States 211-214 are associated with a second state (state 1), third state (state 2), fourth state (state 3), and fifth state (state 4), respectively, of bus initialization state machine 200, providing bus initialization states (BINIT_MODE). Descriptions of these states according to one embodiment of the invention are shown in the table below.

| State | Signal | Description |
| --- | --- | --- |
| 0 Idle (201) | ~BINIT | IDLE-Bus initialization state machine is idle |
| 1 Bus Initialization-1 (211) | BINIT | BINIT_MODE-BINIT is being asserted on the bus |
| 2 Bus Initialization-2 (212) | ~BINIT | BINIT_MODE-Delay cycle to accommodate system protocol |
| 3 Bus Initialization-3 (213) | ~BINIT | BINIT_MODE-Delay cycle to accommodate system protocol |
| 4 Bus Initialization-4 (214) | ~BINIT | BINIT_MODE-Waiting for in-order queue and transaction table to drain, bus priority (BPRI) signal asserted (bus priority state machine operation) |

In normal system operation, bus initialization state machine 200 resides in idle state 201. However, when a bus initialization error is detected on bus 101, bus initialization state machine 200 moves from idle state 201 to first bus initialization state 211. It should be appreciated that bus initialization state 211 may be associated with implementation and/or completion of any of a number of bus initialization activities, such as may be compatible with overriding system protocols. For example, bus initialization state 211 may cause an in-order queue drain state machine, such as that shown and described in the above referenced patent application entitled "System and Method for In-Order Queue Draining" to move from an idle state to a queue draining state or states. Additionally or alternatively, bus initialization state 211 may cause processors, such as processors 131 and 132, and/or other system resources disposed on bus 101 to drop all transactions then being processed in preparation for initialization according to embodiments of the present invention. However, bus initialization state 211 according to alternative embodiments of the present invention may provide a bus initialization stall state, wherein no bus initialization action is taken on behalf of bus initialization state machine 200, if desired.

According to the illustrated embodiment, any time a bus initialization error is asserted on bus 101, bus initialization machine 200 moves to state 211. Accordingly, if additional bus initialization errors are asserted when bus initialization state machine 200 is already at bus initialization state 211, the state machine remains in bus initialization state 211. However, once a bus initialization error is asserted, and that error signal is no longer asserted, bus initialization state machine 200 moves through various ones of the bus initialization states.

According to the illustrated embodiment, system protocols allow several clock cycles, e.g., three clock cycles, after a bus initialization error is asserted for system resources to get off of the bus being initialized. Accordingly, bus initialization state machine 200 includes stall states, here bus initialization stall states 212 and 213, wherein no bus initialization action is taken on behalf of bus initialization state machine 200.

After the bus initialization error signal is deasserted, bus initialization state machine 200 of the illustrated embodiment moves from bus initialization state 211 to bus initialization stall state 212. If a bus initialization error is again asserted, bus initialization state machine 200 moves again to bus initialization state 211 from bus initialization stall state 212. However, if the bus initialization error signal remains deasserted, bus initialization state machine 200 moves from bus initialization stall state 212 to bus initialization stall state 213. If a bus initialization error is again asserted, bus initialization state machine 200 moves again to bus initialization state 211 from bus initialization stall state 213. However, if the bus initialization error signal remains deasserted, bus initialization state machine 200 moves from bus initialization stall state 213 to bus initialization bus priority state 214. It should be appreciated that the above sequence of states accommodates a system protocol in which system resources are given three clock cycles in which to get off of bus 101 when a bus initialization error is detected.

Bus initialization bus priority state 214 of the illustrated embodiment is a state in which bus initialization activity by bus initialization state machine 200 is accomplished. Specifically, bus initialization bus priority state 214 of embodiments of the invention asserts a bus priority signal to prevent system resources, such as processors 131 and 132, from accessing bus 101 during transaction draining for error recovery. Accordingly, such system resources are prevented from initializing, e.g., fetching code to accomplish a "soft boot," during transaction draining according to embodiments of the invention.

It should be appreciated that bus initialization bus priority state 214 may be associated with implementation and/or completion of any of a number of bus initialization activities, such as may be compatible with overriding system protocols. For example, bus initialization bus priority state 214 of a preferred embodiment asserts a bus priority (BPRI) signal throughout the time in which bus initialization state machine 200 remains in bus initialization priority state 214. Additionally or alternatively, bus initialization bus priority state 214 of an embodiment may monitor a processor interface in-order queue draining signal, such as that shown and described in the above referenced patent application entitled "System and Method for In-Order Queue Draining," to determine when in-order queue 111 has been fully drained. Thereafter, bus initialization bus priority state 214 may cause a bus priority state machine, such as that shown and described below with respect to FIG. 3, to move from an in-order queue draining state to an out-of-order queue draining state.

According to embodiments of the present invention, bus initialization state machine 200 will not move from bus initialization bus priority state 214 to return to idle state 201 until transaction draining for error recovery is completed. For example, the illustrated embodiment of bus initialization state machine 200 remains in bus initialization bus priority state 214 until the in-order queue is drained (e.g., processor interface in-order queue deasserts the PIQ_DRAINING signal) and the transaction table is empty (e.g., header/data processing asserts the TRANS_TAB_EMPTY signal). Of course, as with each of states 201, 211, 212, and 213 discussed above, if a bus initialization error signal is again asserted while bus initialization state machine 200 of the illustrated embodiment is in bus initialization priority state 214, bus initialization state machine 200 will again move to bus initialization state 211.

The bus priority (BPRI) signal asserted by bus initialization bus priority state 214 of the illustrated embodiment provides bus priority to bus initialization state machine 200 over the various system resources, such as processors 131 and 132. For example, bus initialization state machine 200 may assert the bus priority signal to hold the processors off the bus so they do not assert any new transactions while the bus queues are draining. It should be appreciated that the bus priority signal of the illustrated embodiment need only be asserted during bus initialization priority state 214 of the bus initialization mode of state machine 200 because the bus protocol prevents system resources from asserting new transactions on the bus for 3 clock cycles, while system resources are allowed to get off of the bus. Of course, variations of bus initialization state machine 200 may be implemented, such as where system protocols are different than those described.

In operation according to the illustrated embodiment, a bus initialization error is detected and bus initialization state machine 200 allows 3 clock cycles (states 211-213) for system resources to get off of bus 101, as is consistent with system protocols. Thereafter, a bus priority signal is asserted by bus initialization state machine 200 to prevent system resources from asserting new transactions on bus 101. Bus initialization state machine 200 allows in-order queue 111 to drain, causes tracked transactions held in transaction table 144 to be dropped, returns non-tracked transactions held in transaction table 144, and allows transactions that are elsewhere on the system to be returned. Thereafter, bus initialization state machine 200 has completed controlling transaction draining and returns to an idle state, allowing system resources back on bus 101 for initializing, e.g., fetching code for a soft boot.

Directing attention to FIG. 3, an embodiment of bus priority state machine 300 is shown. Bus priority state machine 300 of an embodiment of the present invention is operable when bus initialization state machine 200 is in bus initialization bus priority state 214, and thus asserting a bus priority signal to keep system resources off of bus 101. Accordingly, bus priority state machine 300 may be implemented as a part of bus initialization state machine 200, such as states or sub-states of bus initialization bus priority state 214, if desired.

Bus priority state machine 300 of the illustrated embodiment includes states 301, 311, and 312. Because the illustrated embodiment is implemented as part of bus initialization state machine 200 no idle state is provided. However, it should be appreciated that alternative embodiments of bus priority state machine may include such an idle state. State 301 is associated with an overriding state (state 0) of bus priority state machine 300, providing overriding error ignoring and non-tracked transaction issuing. States 311 and 312 are associated with a second state (state 1) and third state (state 2), respectively, of bus priority state machine 300, providing bus queue draining control. Descriptions of these states according to one embodiment of the invention are shown in the table below.

| State | Signal | Description |
|---|---|---|
| 0 | BINIT_MODE | Ignore errors, issue all non-tracked transactions |
| 1 | PIQ_DRAINING BINIT_MODE | POAC: Do not start any requests, can send tracked transactions to POD<br>POD: Do not start any tracked transactions |
| 2 | ~PIQ_DRAINING BINIT_MODE | POAC: Drop deferred reply with hard fail (return header credit), send all the rest including tracked transactions to POD<br>POD: Drop all tracked transactions, send pops to POAC, return data credits |

In operation, bus priority state machine 300 provides an overriding state, state 301, in which errors are ignored and non-tracked transactions, e.g., transactions associated with system resources disposed on other buses, are issued as long as bus initialization state machine 200 remains in bus initialization mode. For example, if a transaction generates an error, because the system is already in a critical error recovery mode it is expected that such generated errors will not be as severe as the one currently being processed and, therefore, they may be ignored. Moreover, such generated errors are likely associated with, or the result of, the critical error being processed and, therefore, may be ignored as a cascade of errors.

Additionally, the illustrated embodiment of state 301 provides control signals for draining transaction table 144. For example, irrespective of whether in-order queue 111 has completed draining, if the bus is in bus initialization mode state 301 may provide a control signal to header/data processing 143 to analyze transaction table 144 and drop all tracked transactions. Additionally, header/data processing 143 may issue all non-tracked transactions of transaction table 144, thereby facilitating continued processing of resources disposed on buses other than the bus for which a bus initialization error has been detected.

Within state 301 of the illustrated embodiment are sub-states 311 and 312 providing control with respect to draining of various tracked transactions. In-order queue draining state 311 of the illustrated embodiment operates to hold all transactions off of bus 101 during the time in which in-order queue 111 is draining. Once in-order queue 111 has drained, processor interface in-order queue 112 will deassert the PIQ_DRAINING signal and bus priority state machine 300 will move from in-order queue draining state 311 to tracked transaction dropping state 312. Tracked transaction dropping state 312 will assert a DROP_TRACKED_TRANS signal causing processor output address control/processing 142 and processor output data 141 to drop tracked transactions associated therewith. Additionally, embodiments of tracked transaction dropping state 312 will allow transactions which have not been returned from other parts of the system to time out, preferably as shown and described in the above referenced patent application entitled "System and Method for Determining Transaction Time-Out", and those transactions are dropped.

It should be appreciated that in operation the majority of tracked transactions go to processor output data 141, according to one embodiment, as they are data returns and the like. Accordingly, there may be transactions already provided to processor output data 141 when a bus initialization error is encountered and, therefore, processor output data 141 preferably drops these tracked transactions under control of bus priority state machine 300. Additionally, under control of bus priority state machine 300 processor output data 141 may drop tracked transactions as they are provided thereto while in tracked transaction dropping state 312.

Processor output address control/processing 142 of one embodiment does have at least one tracked transaction that is provided thereto. For example, a deferred reply with hard fail transaction provided to processor output address control/processing 142 may be tracked. Accordingly, processor output address control/processing 142 of the illustrated embodiment drops at least this transaction under control of bus priority state machine 300.

All tracked transactions may continue to be dropped under control of bus priority state machine 300 while the bus initialization state machine 200 remains in bus initialization mode. However, when bus priority state machine 300 is in tracked transaction dropping state 312, at which point the in-order queue has already been drained, if there are any new requests coming up that are not tracked, those transactions will be allowed on the bus according to embodiments of the invention.

It should be appreciated that dropping transactions under control of bus priority state machine 300 may be accomplished in a number of ways. For example, processor output data control 141, processor address control/processing 142, and/or header/data processing 143 may delete the appropriate transactions. Additionally or alternatively, processor output data control 141, processor address control/processing 142, and/or header/data processing 143 may operate to put the appropriate transactions out on the bus in such a way that they become invisible. According to one embodiment, transactions to be dropped have ID bits thereof manipulated such that when these transactions are put on bus 101 all the processors ignore it, e.g., the transaction data returns an ID that is associated with none of the processors.

It should be appreciated that providing for draining of queues in the above described order accommodates "spoofing" completion of the various pending transactions in accordance with system protocols. Specifically, the in-order queue, itself drained in accordance with system protocols as described in the above referenced patent application entitled "System and Method for In-Order Queue Draining," is drained before various transactions held by the out-of-order queue, allowing particular transaction requests to be moved through the system substantially as in normal operation, e.g., returning responses to system resources not disposed on the bus experiencing a bus initialization error to avoid their processing "hanging". Accordingly, a bus initialization state machine of embodiments of the present invention coordinates when particular actions are to take place, in part determined by system protocols, to provide for orderly transaction draining for graceful system crashing and/or error recovery.

If implemented in software or microcode, the elements of the present invention are essentially the code segments to perform tasks as described herein. The program or code segments can be stored in a computer readable medium or transmitted by a computer data signal embodied in a carrier wave, or a signal modulated by a carrier, over a transmission medium. The computer readable medium may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

What is claimed is:

1. A method for controlling transaction draining for error recovery, said method comprising:
asserting a control signal in response to an error to prevent system resources associated with a particular error from issuing new requests;
allowing an in-order queue to drain transactions stored therein according to a system protocol;
dropping transactions tracked by an out-of-order queue during assertion of said control signal; and after said in-order queue has drained said transactions stored therein and said transactions tracked by said out-of-order queue have been dropped, allowing said system resources to issue new requests.

2. The method of claim 1, wherein said dropping transactions and said issuing transactions are performed by at least one of a processor output address block and a processor output data block.

3. The method of claim 1, further comprising:
dropping transactions stored in said out-of-order queue.

4. The method of claim 1, further comprising:
ignoring errors generated in association with said transactions.

5. The method of claim 1, further comprising:
implementing at least one stall state prior to said asserting said control signal.

6. The method of claim 5, wherein said implementing said at least one stall state controls said asserting said control signal in correspondence with a system protocol.

7. The method of claim 5, wherein said implementing said at least one stall state facilitates a bus reaching a quiescent state.

8. The method of claim 1, wherein said particular error comprises a bus initialization error.

9. The method of claim 1, wherein said system resources comprise processors disposed upon a same bus.

10. A method for controlling transaction draining in a multi-processor system, said method comprising:
preventing particular system resources from issuing new requests;
allowing an in-order queue to drain transactions stored therein according to a system protocol;
dropping transactions stored in an out-of-order queue; and
after said in-order queue has drained said transactions stored therein and said out-of-order queue has dropped said transactions stored therein, allowing said system resources to issue new requests.

11. The method of claim 10, wherein said preventing system resources from issue new requests comprises:
asserting a bus priority signal.

12. The method of claim 11, further comprising:
invoking a predetermined number of stall states prior to asserting said bus priority signal.

13. The method of claim 11, wherein said particular system resources comprise system resources coupled to a particular bus.

14. The method of claim 10, wherein said allowing said in-order queue to drain is in response to detecting a bus initialization error.

15. The method of claim 10, further comprising:
issuing responses associated with transactions not stored in said out-of-order queue.

16. The method of claim 10, further comprising:
ignoring errors generated in association with said transactions.

17. A system for controlling transaction draining for error recovery, said system comprising:
a first state machine having at least a first error mode state and a second error mode state, wherein said first state machine is operable to enter said first error mode state whenever a particular error is asserted, and wherein said first state machine is operable to enter said second error mode state after said error is asserted, said second error mode state asserting a control signal to hold system resources off of a particular bus while said state machine is in said second error mode state.

18. The system of claim 17, wherein said first state machine includes at least one stall state, said first state machine moving through said at least one stall state when sequencing between said first error mode state and said second error mode state.

19. The system of claim 18, wherein said at least one stall state facilitates operation of said first state machine asserting said control signal in accordance with a system protocol.

20. The system of claim 17, wherein said first state machine remains in said second error mode state at least until an in-order queue has been drained and all transactions in an out-of-order queue have been dropped.

21. The system of claim 20, further comprising:
a second state machine having an in-order queue draining state and a tracked transaction dropping state.

22. The system of claim 21, wherein said second state machine includes a issue non-tracked transaction state.

23. A computer program product having a computer readable medium having computer program logic recorded thereon for controlling transaction draining for error recovery, the computer readable medium being selected from the group consisting of an electronic circuit, a semiconductor memory device, a ROM, a flash memory, an erasable ROM, a floppy diskette, a compact disk CD-ROM, an optical disk, and a hard disk, said computer program product comprising:
code for asserting a control signal to prevent system resources associated with a particular error from issuing new requests;
code for allowing an in-order queue to drain transactions stored therein according to a system protocol;
code for dropping transactions tracked by an out-of-order queue during assertion of said control signal; and
code for allowing said system resources to issue new requests after said in-order queue has drained said transactions stored therein and said transactions tracked by said out-of-order queue have been dropped.

* * * * *

UNITED STATES PATENT AND TRADEMARK OFFICE
CERTIFICATE OF CORRECTION

PATENT NO.        : 7,373,555 B2                                Page 1 of 1
APPLICATION NO.   : 10/434920
DATED             : May 13, 2008
INVENTOR(S)       : Richard W. Adkisson et al.

It is certified that error appears in the above-identified patent and that said Letters Patent is hereby corrected as shown below:

In column 1, line 12, delete "10/443,685" and insert -- 10/434,685 --, therefor.

In column 3, line 53, delete "BPRL" and insert -- BPRI --, therefor.

Signed and Sealed this

Twenty-ninth Day of July, 2008

JON W. DUDAS
*Director of the United States Patent and Trademark Office*